United States Patent
Fischer et al.

(10) Patent No.: US 6,182,692 B1
(45) Date of Patent: Feb. 6, 2001

(54) VALVE ASSEMBLY FOR AN APPARATUS UNDER PRESSURE

(75) Inventors: Andreas Fischer, Menden; Franz Kamp, Schwerte, both of (DE)

(73) Assignee: VTI Ventil Technik GmbH, Menden (DE)

( * ) Notice: Under 35 U.S.C. 154(b), the term of this patent shall be extended for 0 days.

(21) Appl. No.: 09/533,627

(22) Filed: Mar. 22, 2000

(30) Foreign Application Priority Data

Mar. 23, 2000 (DE) .............................................. 199 13 230

(51) Int. Cl.$^7$ ...................................................... F16K 37/00
(52) U.S. Cl. .......................... 137/557; 285/93; 116/266; 222/23
(58) Field of Search .................................... 137/557, 227, 137/229; 222/23; 116/266, 268; 285/93

(56) References Cited

U.S. PATENT DOCUMENTS

| 3,963,267 | * | 6/1976 | Legris | 285/93 |
| 4,116,217 | * | 9/1978 | Speidel | 137/557 |
| 4,327,589 | * | 5/1982 | Forster | 137/557 X |
| 5,007,447 | * | 4/1991 | Penitot et al. | 137/556 X |
| 5,086,807 | * | 2/1992 | Lasnier et al. | 137/557 X |

* cited by examiner

Primary Examiner—Kevin Lee
(74) Attorney, Agent, or Firm—Henry M. Feiereisen

(57) ABSTRACT

A valve assembly for an apparatus under pressure, includes a valve casing with a connecting pipe having formed therein a fluid passageway. A valve body is received in the valve casing and movable against a valve seat for sealing the fluid passageway and thereby separate a high-pressure zone from a low-pressure zone. Integrated in a handwheel of the valve body is a manometer which is constraint against rotation, when the handwheel is turned with respect to the manometer. The manometer is in communication with the high-pressure zone regardless whether the valve seat is closed or open.

14 Claims, 4 Drawing Sheets

VALVE ASSEMBLY FOR AN APPARATUS UNDER PRESSURE

CROSS-REFERENCES TO RELATED APPLICATIONS

This application claims the priority of German Patent Application Serial No. 199 13 230.5, filed Mar. 23, 1999, the subject matter of which is incorporated herein by reference.

BACKGROUND OF THE INVENTION

The present invention relates to a valve assembly for an apparatus under pressure, such as a vessel under gas or vapor pressure.

There are many designs of valve assemblies available to date. Through continuous optimization of the design and improvement of the manufacturing process as well as through use of latest tools, valves assemblies can be made increasingly lighter and more compact whereby their design should be limited only by standardized connection sizes, safety aspects and ergonomic configuration. Valve assemblies may frequently include a valve body fitted in a valve casing and having a manometer that is integrated in a handwheel of the valve body so as to protect the manometer against impacts and to configure the valve assembly more compact and lighter. The placement of the manometer in this fashion suffers, however, shortcomings, because the manometer rotates conjointly with the handwheel so that the display may be upside down for an observer and thus becomes more difficult to read. Not only is this disadvantageous as far as ergonomics is concerned but also compromises safety aspects as the observer may incorrectly read the display and thereby may possibly cause disastrous results.

SUMMARY OF THE INVENTION

It is thus an object of the present invention to provide an improved valve assembly, obviating the afore-stated drawbacks.

In particular, it is an object of the present invention to provide an improved valve assembly for an apparatus under pressure, such as a vessel under gas or vapor pressure, which is ergonomically superior and is optimized as far as safety is concerned.

These objects, and others which will become apparent hereinafter, are attained in accordance with the present invention by providing a valve assembly which includes a valve body with a connecting pipe having formed therein a fluid passageway; a valve body received in the valve casing and movable against a valve seat for sealing the fluid passageway and thereby separate a high-pressure zone from a low-pressure zone; and a manometer so integrated in a handwheel of the valve body as to be constraint against rotation, whereas the handwheel is rotatably supported with respect to the manometer.

In accordance with the present invention, the manometer is so integrated in the handwheel as to be constraint against executing a rotation relative to the handwheel. Thus, the handwheel may be turned, without having the manometer follow the rotation, so that the position of the display to read the manometer remains always the same. This is ergonomically desired and advantageous. The observer can now easily and conveniently read the display, and there is no need to ponder on the correctness of the reading or even to adjust the handwheel in order to enhance the legibility of the display. This facilitates the daily use and is particularly valuable in emergency situations when immediate availability of important information, such as pressure of the filled contents, is required.

The valve assembly according to the invention may be a shut-off valve with a shut-off valve body or a pressure control valve, e.g. as diaphragm-operated pressure control valve or piston-operated pressure control valve with a corresponding control valve body. A shut-off valve body of a shut-off valve assembly or a control valve body of a pressure control valve assembly can rest against a valve seat to seal the fluid passageway to thereby define the high-pressure zone and the low-pressure zone in the valve casing.

According to another feature of the present invention, the manometer is in communication with the high-pressure zone, thereby permitting the operator to monitor the filling degree in the vessel under pressure, in particular high-pressure gas bottles. This is especially advantageous when configuring the valve assembly according to the present invention as a shut-off valve, whereby the manometer communicates with the high-pressure zone even when the valve seat is closed. Thus, the prevalent pressure in the pressure vessel can be read, without requiring any manipulations to open the shut-off valve. The communication of the manometer with the high-pressure zone is assured in any position of the shut-off valve body or control valve body.

Heretofore, it was normally required for determination of the pressure inside the pressure vessel to first attach a manometer via a screwed connection and subsequently to open the shut-off valve, wherein small amounts of gas can always escape when the manometer is removed. With the configuration of a valve assembly in accordance with the present invention, the pressure inside the pressure vessel can now be read at any time, without removal of the manometer and the accompanying risk of escape of gas into the ambient atmosphere.

Suitably, the handwheel and the manometer define coinciding longitudinal axes, in particular an identical longitudinal axis, so that the manometer is centered inside the handwheel. This configuration facilitates the manufacturing process, and the manometer, which is integrated in the handwheel, can communicate with the high-pressure zone of the valve assembly via a capillary tube or capillary bore that extends centrally through the shut-off valve body or control valve body.

Although the manometer is normally fixed in place in the handwheel, it may be suitable for some applications to arrange the manometer axially movably with respect to the handwheel. Persons skilled in the art will also understand that it is certainly within the scope of the present invention, in particular when the valve assembly is a piston-operated pressure control device, to use a handwheel that is movable linearly as well as rotatably, for example, for adjusting and regulating the low pressure.

In a configuration of the valve assembly as pressure control device, in particular as piston-operated pressure control device, with a piston-type control valve body for regulating a pressure in the low-pressure zone through axial displacement in the valve housing, the capillary tube, connected to the manometer, should follow the linear movements of the control valve body, without adversely affecting the precision of control of the control valve. For this purpose, the friction between the rotationally fixed manometer and the rotatable handwheel and other components of the valve assembly should be minimized through incorporation of suitable sealing elements.

According to another feature of the present invention, a cover plate is secured to the handwheel for protection of the manometer so that the manometer is protected inside the handwheel not only in circumferential direction but also its sight glass is now protected at the end face of the manometer. The cover plate can be secured in fluid-tight fashion and protects the manometer against environmental impacts such as splash water or saline water during scuba diving.

Suitably, the handwheel and the cover plate form a housing for the manometer. In this way, the need for a separate manometer housing is eliminated, so that the valve assembly can be produced more cost-efficient and of lighter weight.

According to another aspect of the present invention, the manometer may be secured against rotation at least indirectly in the valve casing. The securement against rotation may be provided in the shut-off valve body as well as in the control valve body, in particular in the area of the shut-off element or control element. For example, the capillary tube may be secured in a plastics seal of the shut-off valve body or the control valve body. It is, however, also possible to secure the manometer in a manometer holder linked to the shut-off valve body or the control valve body, with the holder being in fixed rotative engagement with a solely linearly movable valve stem, e.g. via a tetragonal surface configuration.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
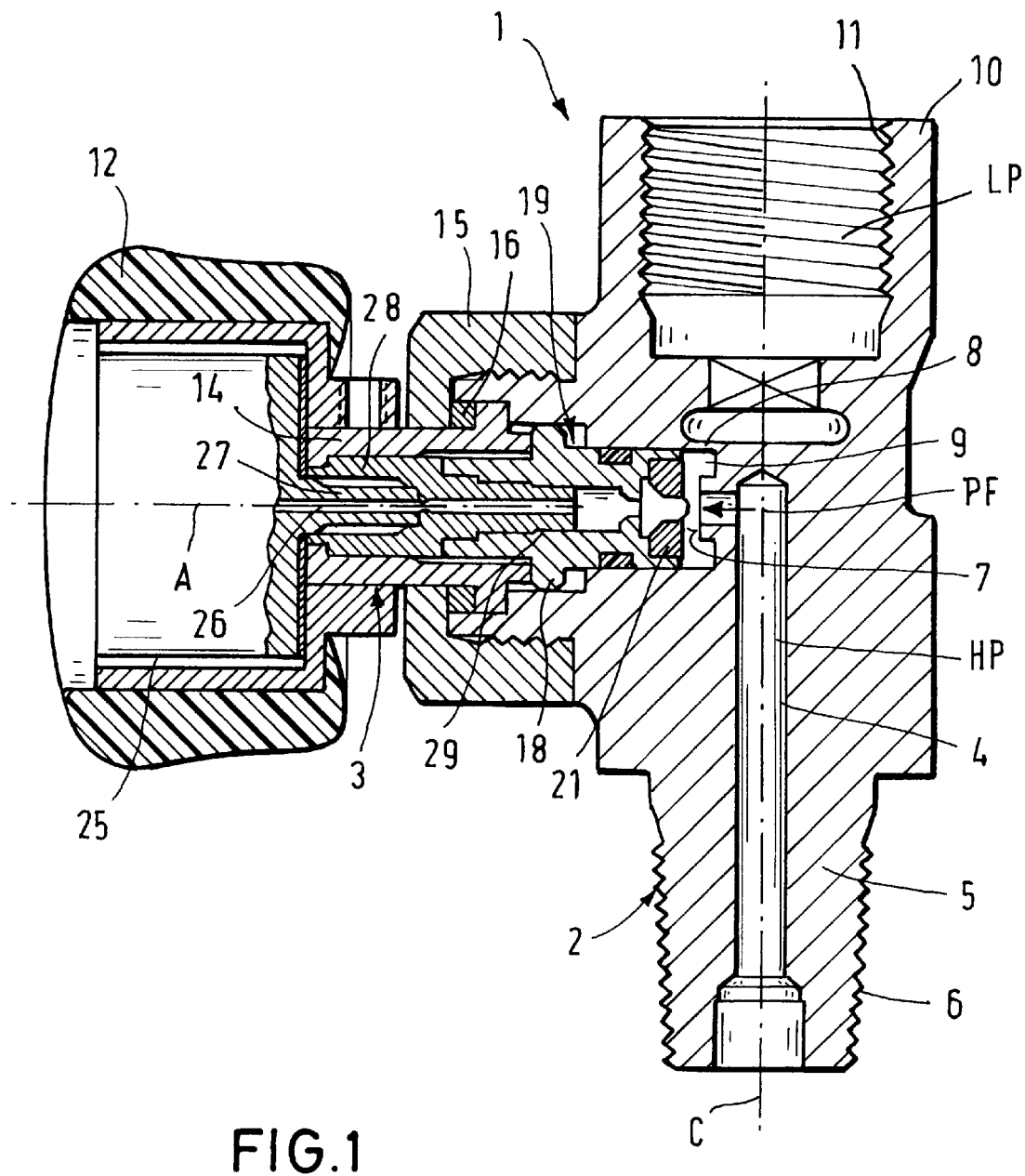
FIG. 1 is a vertical longitudinal section of a valve assembly according to the present invention in the form of a shut-off valve.

Throughout all the Figures, same or corresponding elements are generally indicated by same reference numerals.

Turning now to the drawing, and in particular to FIG. 1, there is shown a vertical longitudinal section of a valve assembly according to the present invention, generally designated by reference numeral 1 and designed as a shut-off valve. The valve assembly 1 includes a valve casing 2 for accommodating a shut-off valve body 3, which extends horizontal in the illustration of FIG. 1 and is shown in greater detail in FIG. 2. The valve casing 2 includes a connecting piece 5 for attachment of the valve assembly 1 to an apparatus under pressure, such as a pressure vessel, via a conical threaded section 6. The connecting piece 5 has formed therein a fluid passageway 4, which extends vertical to the valve body 3 and terminates at a valve seat 7. A transverse bore 8 is formed in the valve casing 2 to fluidly connect a valve-seat-circumscribing valve chamber 9 with a connection port 10 which is adapted for attachment to other components of a fluid-operated system (not shown) via an internal thread 11. The connection port 10 defines a longitudinal center axis C, which coincides with a center axis of the connecting piece 5 and the fluid passageway 4.

The valve body 3 includes an upper valve stem 14 which is rotatably supported in the valve casing 2 and fixedly secured to a handwheel 12 via a screw (not shown) which is received in a radial bore 13 of the handwheel 12, to thereby permit operation of the valve body 3. The handwheel 12 defines together with the valve body 3 a pivot axis A, which extends centrally in perpendicular relation to the center axis C through the valve seat 7. A coupling nut 15 secures the valve body 3 in place inside the valve casing 2 via incorporation of a sliding ring 16.

Figure 2:
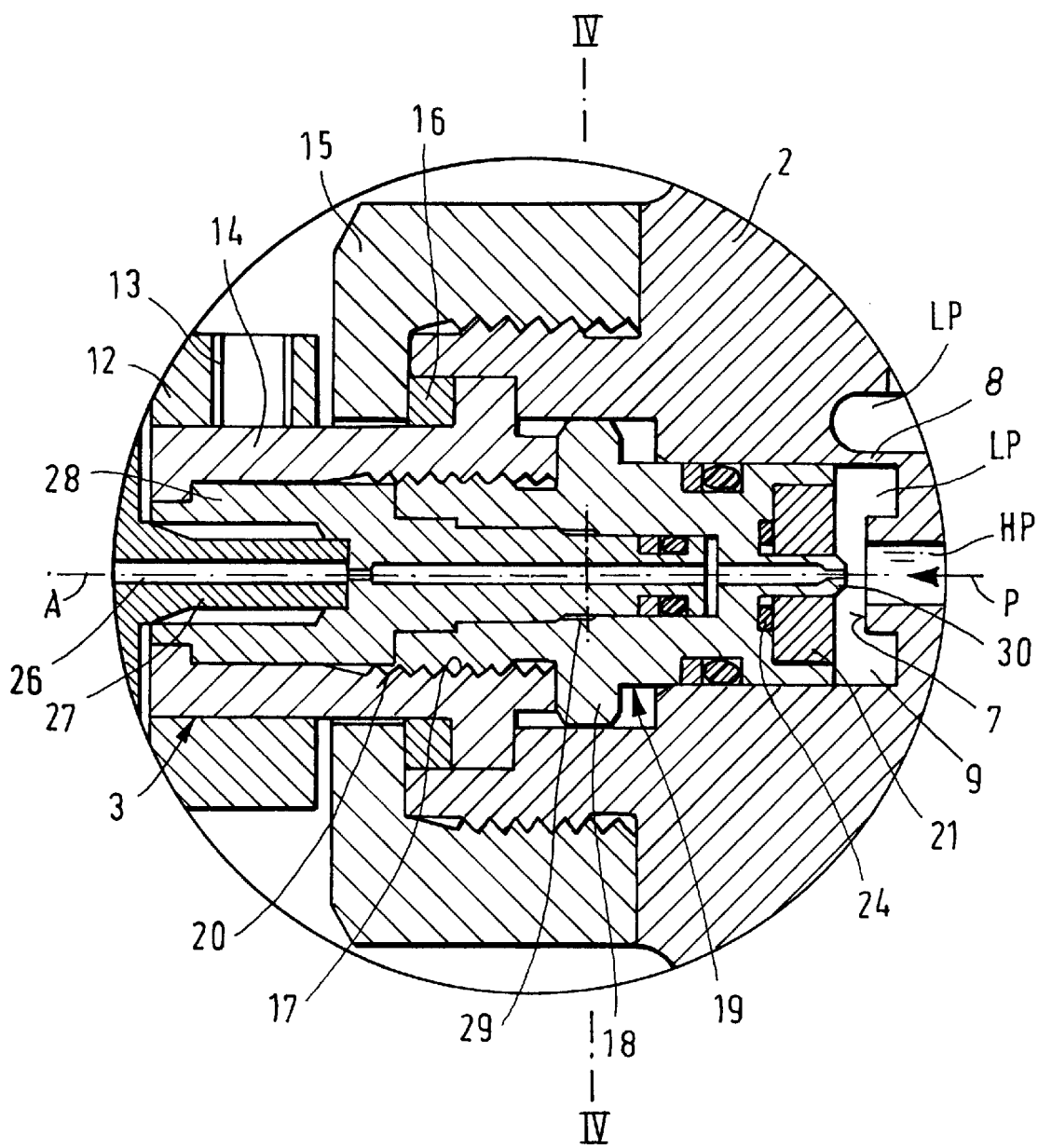
FIG. 2 is a cutaway view, on an enlarged scale, of a shut-off valve body incorporated in the valve assembly of FIG. 1.

As best seen in FIG. 2, the upper valve stem 14 has an internal thread 17, which is in mesh with an external thread 20 of a shut-off element 19 for attachment of the shut-off element 19 to the upper valve stem 14. The shut-off element 19 forms a lower valve stem of the valve assembly 1 and is secured against rotation by retaining lugs 18 in the valve casing 2, so that a turning of the upper valve stem 14 through actuation of the handwheel 12 is translated into a linear displacement of the shut-off element 19 in the direction of the pivot axis A. On its valve seat confronting end face, the shut-off element 19 includes a valve disk 21 which is pressed in sealing engagement against the valve seat 7, when cutting the fluid connection between the passageway 4 and the connection port 10 through suitable actuation of the handwheel 12, so that the fluid-carrying pathways of the valve assembly 1 are separated from one another, i.e. in a high-pressure zone HP defined by the fluid passageway 4, and a low-pressure zone LP defined by the valve chamber 9 and the connection port 10. An O-ring 24 forms a seal between the valve disk 21 and the shut-off element 19.

Figure 4A:
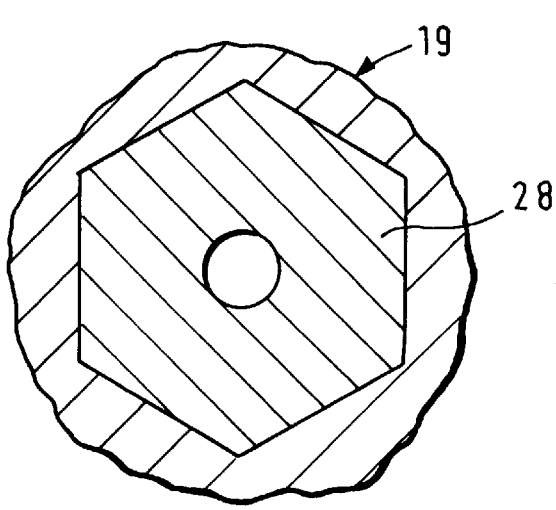
FIGS. 4a–4d are schematic sectional views of various exemplified illustrations of a fixed rotative engagement between the manometer holder and the shut-off valve, taken along the line IV—IV in FIG. 2.
Figure 4B:
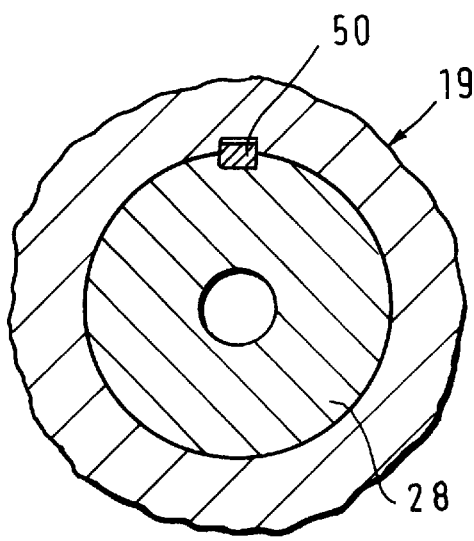
Figure 4C:
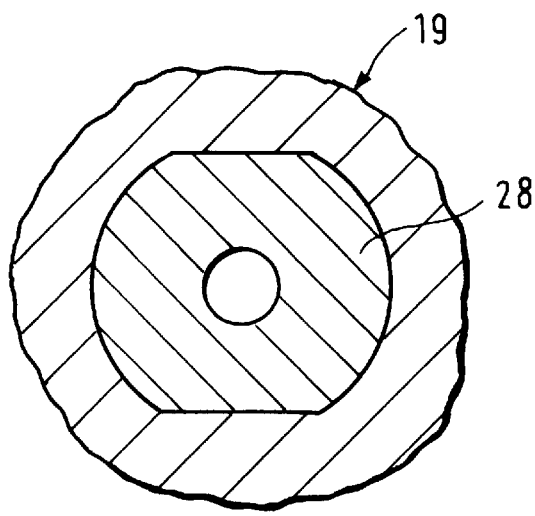
Figure 4D:
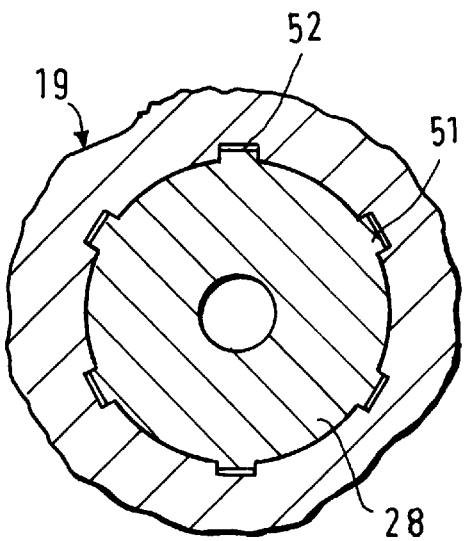

Referring again to FIG. 1, there is shown a manometer 25, which is integrated in the handwheel 12 at a same orientation but is de-coupled from the handwheel 12. A capillary bore 26 connects the manometer 25 with the high-pressure zone HP of the valve assembly 1. The manometer 25 includes a threaded pin 27, which is threaded in a manometer holder 28 that is rotatably supported in the upper valve stem 14. The manometer holder 28 projects into the shut-off element 19 and is secured therein against rotation so that the shut-off element 19 moves in linear direction relative to the manometer holder 28. The fixed rotative engagement between the shut-off element 19 and the manometer holder 28 may be realized, for example, via a planar guide surface 29 or several guide surfaces, in the form of, e.g., a hexagon. Examples of such fixed rotative engagements between the manometer holder 28 and the shut-off element 19 are illustrated in FIGS. 4a, 4b, 4c, 4d, with FIG. 4a showing a complementary hexagonal configuration of the manometer holder 28 and the shut-off element 19, with FIG. 4b showing the incorporation of a key or pin 50 between the manometer holder 28 and the shut-off element 19, with FIG. 4c showing the manometer holder 28 and the shut-off element 19 with complementary diametrically opposite flattened areas. In the nonlimiting example of FIG. 4d, the manometer holder 28 is formed with outwardly projecting tongues 51 for engagement in complementary grooves 52 of the shut-off elements 19 to implement a tongue and groove joint. Persons skilled in the art will of course understand that the examples shown in FIGS. 4a, 4b, 4c, 4d are only shown for illustrative purposes, and other types of such constraint means to secure the manometer against rotation should certainly be considered within the scope of the present invention.

The capillary bore 26, which extends from the manometer 25 to the valve disk 21, passes centrally through the threaded pin 27, the manometer holder 28, the shut-off element 19 and the valve disk 21 and terminates in a port 30, as best seen in FIG. 2. The port 30 of the capillary bore 26 is aligned with the outflow direction of gas from the valve seat 7, as indicated by arrow P, so that the manometer 25 is in communication with the high-pressure zone HP even when the valve assembly is open. Thus, when the valve seat 7 is closed, the operator is in a position to read on the manometer 25 a prevailing pressure in the high-pressure zone HP.

Figure 3:
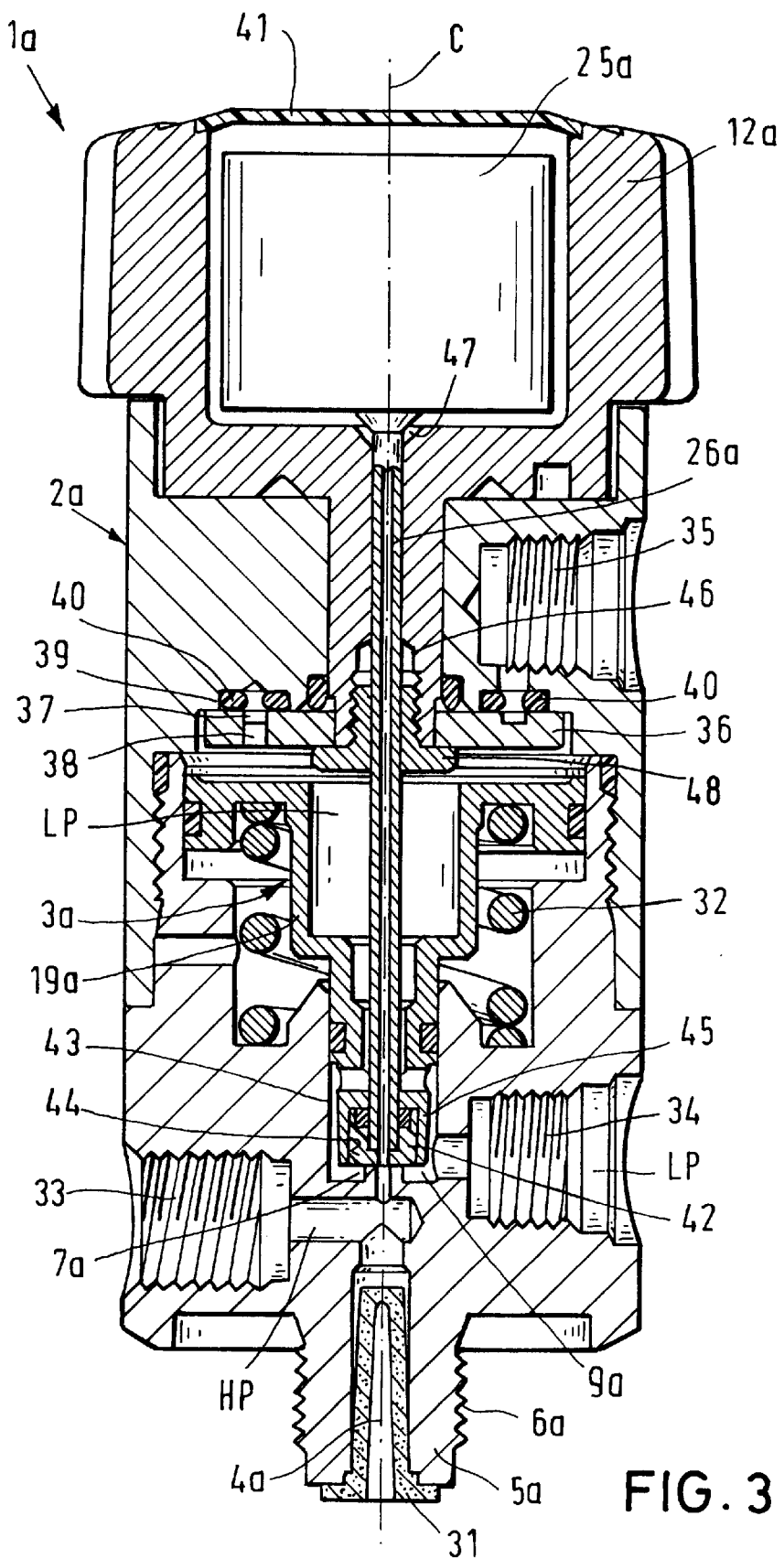
FIG. 3 is a vertical longitudinal section of a valve assembly according to the present invention in the form of a pressure control device.

Turning now to FIG. 3, there is shown a vertical longitudinal section of another valve assembly according to the present invention, generally designated by reference numeral 1*a* and designed as a pressure control device. In the following description, parts corresponding with those in FIG. 1 will be identified by corresponding reference numerals followed by an "a". The valve assembly 1*a* is provided with an adapter (not shown) for attachment to a valve of a pressure vessel via a connecting piece 5*a* with threaded section 6*a*, whereby the adapter has a country-specific configuration. Placed in the connecting piece 5*a* is a cup-shaped filter insert 31 to prevent contamination of the valve assembly 1*a*.

The valve assembly 1*a* has a valve casing 2*a* of substantially cylindrical configuration which is defined by a vertical longitudinal center axis C. Extending in the connecting piece 5*a* in alignment with the center axis C is a fluid passageway 4*a* which continues to a valve seat 7*a*. The valve seat 7*a* contacts a control valve body 3*a* which is movable in linear direction in the direction of the center axis C. The control valve body 3*a* includes a piston-like control element 19*a* which is guided in the valve casing 2*a* and loaded by a helical compression spring 32, whereby one end of the compression spring 32 rests against the valve casing 2*a*, and the other end of the compression spring 32 rests against the control element 19*a*. When the control element 19*a* rests against the valve seat 7*a*, the resultant spring force is determinative for the pressure prevalent in the low-pressure zone LP.

Positioned transversely to the center axis C, the valve casing 2*a* has several ports for connection to further components of the fluid-operated system. A high-pressure outlet port 33 is connected to the fluid passageway 4*a* and forms the high-pressure zone HP of the valve assembly 1*a*. Arranged in the valve casing 2*a* diametrical to the high-pressure outlet port 33 are two low-pressure outlet ports 34, 35 in spaced-apart relation. The lower low-pressure outlet port 34 terminates in the valve chamber 9*a*, whereas the upper low-pressure outlet port 35 communicates with the low-pressure zone LP of the valve assembly 1*a* via a groove 37, formed in a selector disk holder 36, and a bore 38, formed in the selector disk holder 36 in prolongation of the groove 37. The selector disk holder 39 is rotatably held in the valve casing 2*a* and operated by a handwheel 12*a* which is turnable in defined index positions. Disposed between the selector disk holder 36 and the valve casing 2*a* is a selector disk 39 which is secured against rotation with respect to the selector disk holder 36. The selector disk 39 is formed with bores of different diameters to allow regulation of a flow rate at the low-pressure outlet port 35, whereby the low-pressure outlet port 35 can also be closed via the selector disk 39. In the valve casing 2*a*, the selector disk 39 bears against sliding rings 40 which form a seal of the low-pressure zone LP, on the one hand, and operate as sliding bearings, on the other hand.

Analog to the shut-off valve shown in FIG. 1, the pressure control valve of FIG. 3 has integrated in the handwheel 12*a* a manometer 25*a* which is in communication with the high-pressure zone HP via a centrally disposed capillary tube 26*a* which extends coaxial with the center axis C. A cover plate 41 is secured to the open-topped end face of the handwheel 12*a* to protect the manometer 25*a* from external impacts.

The manometer 25*a* is secured against rotation by the capillary tube 26*a* in the control valve body 3*a*. For this purpose, the lower end of the capillary tube 26*a* is secured in a sealing element 42 which is fitted in a pocket 44 of the control element 19*a* and seals the valve seat 7*a* whereby the lower end of the capillary tube 26*a* is additionally sealed through an O-ring 43 received in the sealing element 42. The pocket 44 of the control element 19*a* has sidewalls 45 which are radially pressed inwards to thereby secure the sealing element 42 and the capillary tube 26*a*. Thus, a linear displacement of the control valve body 3*a* is followed conjointly by the capillary tube 26*a* and the manometer 25*a*. In order to prevent an interference between the handwheel 12*a* and the conjoint movement of the capillary tube 26*a* and the manometer 25*a* in linear direction in response to a linear displacement of the valve body 3*a*, the manometer-confronting end face of the handwheel 12*a* is formed with a recess, e.g. of conical configuration which complements the configuration of the adjacent end of the capillary tube 26*a*. A sleeve 48 is received in a manometer-distal end face of the handwheel 12*a* to guide the capillary tube 26*a* during linear displacement.

In order to minimize an axial friction, the capillary tube 26*a* is sealed in a central region by a smooth seal 46, for example an O-ring.

While the invention has been illustrated and described as embodied in a valve assembly for an apparatus under pressure, it is not intended to be limited to the details shown since various modifications and structural changes may be made without departing in any way from the spirit of the present invention.

What is claimed as new and desired to be protected by Letters Patent is set forth in the appended claims:

1. A valve assembly for an apparatus under pressure; comprising:
   a valve casing including a connecting pipe for attachment to an apparatus under pressure, said connecting pipe having formed therein a fluid passageway;
   a valve body received in the valve casing and movable against a valve seat for sealing the fluid passageway and thereby separate a high-pressure zone from a low-pressure zone;
   a handwheel operatively connected to the valve body; and
   a manometer so integrated in the handwheel of the valve body as to be secured against rotation relative to the handwheel, when the handwheel turns relative to the manometer.

2. The valve assembly of claim 1 wherein the manometer communicates with the high-pressure zone.

3. The valve assembly of claim 1 wherein the handwheel and the manometer define coinciding longitudinal axes.

4. The valve assembly of claim 1 wherein the manometer is arranged in the handwheel for axial displacement with respect to the handwheel.

5. The valve assembly of claim 1, and further comprising a cover plate secured to the handwheel for protection of the manometer.

6. The valve assembly of claim 1 wherein the handwheel and the cover plate form a housing for the manometer.

7. The valve assembly of claim 1 wherein the manometer is secured against rotation at least indirectly in the valve casing.

8. The valve assembly of claim 1 wherein the manometer communicates with the high-pressure zone via a capillary bore extending between the manometer and the high-pressure zone.

9. The valve assembly of claim 1 wherein the valve body has an upper valve stem and a lower valve stem which is so connected to the upper valve stem as to execute a linear movement when the upper valve stem is turned by the handwheel, and further comprising a holder receiving the manometer and so connected to the lower valve stem that the lower valve stem is movable in linear direction relative to the manometer.

10. The valve assembly of claim 8 wherein the capillary tube has one end secured to the manometer and another end fixedly mounted in the valve body, thereby realizing a securement of the manometer against rotation indirectly in the valve casing.

11. The valve assembly of claim 1 wherein the valve body is one of a shut-off element and a control valve element.

12. The valve assembly of claim 1, and further comprising a holder which receives the manometer, said holder and said valve body having areas of complementary polygonal configuration for securing the manometer against rotation.

13. The valve assembly of claim 1, and further comprising a holder which receives the manometer, said holder and said valve body being connected to one another via a tongue and groove joint for securing the manometer against rotation.

14. The valve assembly of claim 1, and further comprising a holder which receives the manometer, said holder and said valve body being connected to one another via a pin for securing the manometer against rotation.

* * * * *

UNITED STATES PATENT AND TRADEMARK OFFICE
CERTIFICATE OF CORRECTION

PATENT NO. : 6,182,692 B1
DATED : February 6, 2001
INVENTOR(S) : Andreas Fischer & Franz Kamp It is certified that error appears in the above-identified patent and that said Letters Patent is hereby corrected as shown below:

In the Foreign Application Priority Data: Please correct "March 23, 2000" to -- March 23, 1999 --.

Signed and Sealed this

Eighteenth Day of September, 2001

*Attest:*

NICHOLAS P. GODICI
*Attesting Officer*  *Acting Director of the United States Patent and Trademark Office*